United States Patent
Luciano, Jr. et al.

(10) Patent No.: US 6,541,921 B1
(45) Date of Patent: Apr. 1, 2003

(54) ILLUMINATION INTENSITY CONTROL IN ELECTROLUMINESCENT DISPLAY

(75) Inventors: Robert Anthony Luciano, Jr., Reno, NV (US); William Keith Bertram, Reno, NV (US); Alexander Prokop, Reno, NV (US); Richard Louis Hicksted, Incline Village, NV (US)

(73) Assignee: Sierra Design Group, Reno, NV (US)

( * ) Notice: Subject to any disclaimer, the term of this patent is extended or adjusted under 35 U.S.C. 154(b) by 29 days.

(21) Appl. No.: 10/045,504

(22) Filed: Oct. 17, 2001

(51) Int. Cl.[7] ................................. G09G 3/10
(52) U.S. Cl. ................. 315/169.3; 315/169.1; 313/495
(58) Field of Search ................ 315/169.1, 169.3; 313/309, 310, 495, 496, 351; 445/51, 36; 257/10

(56) References Cited

U.S. PATENT DOCUMENTS

| | | | |
|---|---|---|---|
| 5,293,098 A | 3/1994 | Brownell | 315/169.3 |
| 5,463,283 A | 10/1995 | Sanderson | 315/209 R |
| 5,686,797 A | 11/1997 | Sanderson | 315/209 R |
| 5,814,947 A | 9/1998 | Brownell | 315/169.3 |
| 5,866,988 A * | 2/1999 | Oda | 315/169.1 |
| 6,043,609 A | 2/2000 | George et al. | 315/169.3 |
| 6,184,625 B1 * | 2/2001 | Oda | 315/169.3 |

* cited by examiner

Primary Examiner—Don Wong
Assistant Examiner—Jimmy T. Vu
(74) Attorney, Agent, or Firm—Jonathan T. Velasco; Russ F. Marsden

(57) ABSTRACT

A controller for controlling the intensity of an electroluminescent display is disclosed. The controller controls a number of skipped cycles in a cycle set of an applied waveform to the electroluminescent display to vary the average duty cycle, and thereby adjust the intensity of the electroluminescent display. The controller is further configured to adjust the intensity of individual channels within the electroluminescent display to provide compensation for display aging, color variation, as well as for varying intensity for various operating modes.

73 Claims, 8 Drawing Sheets

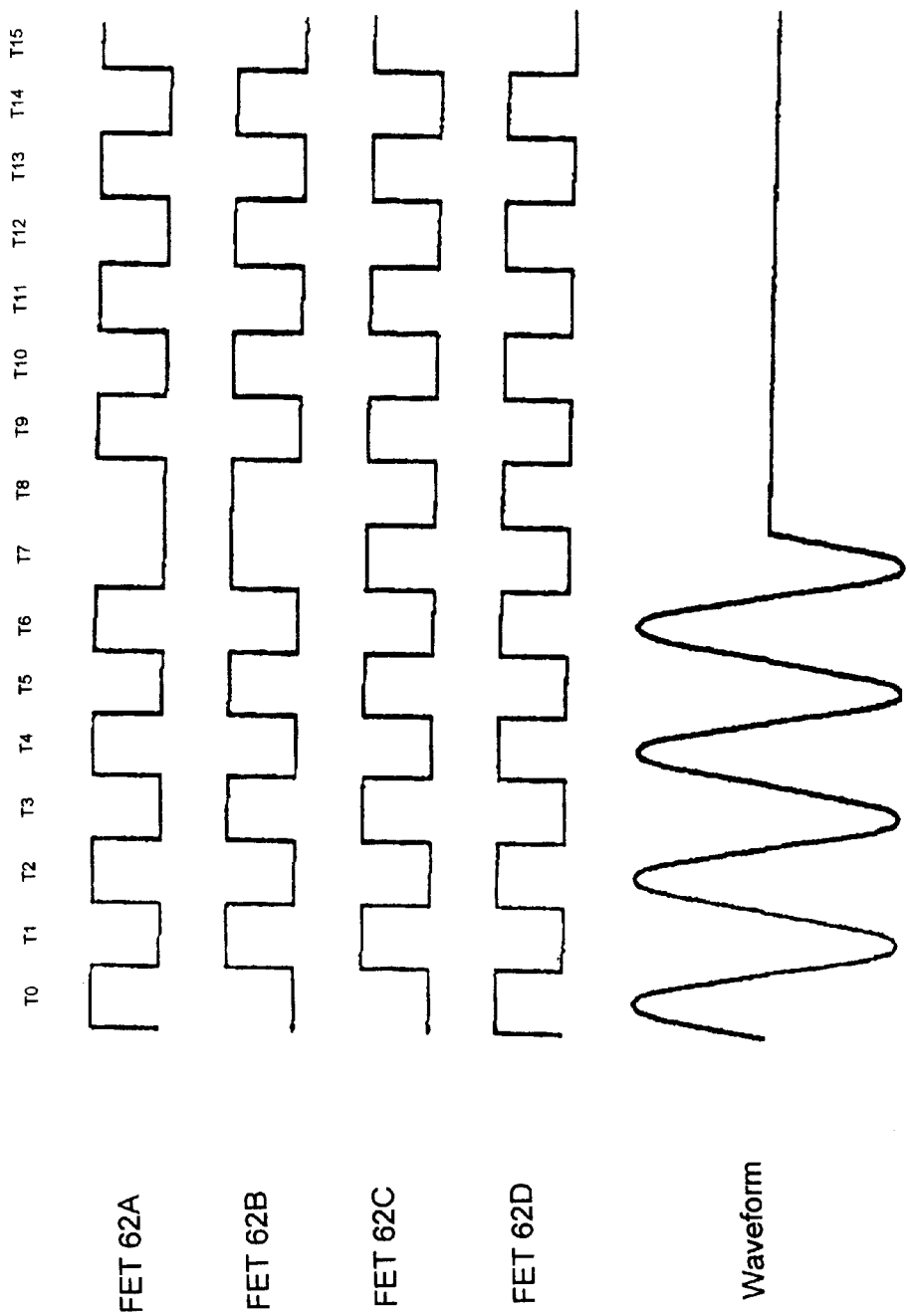

ILLUMINATION INTENSITY CONTROL IN ELECTROLUMINESCENT DISPLAY

BACKGROUND OF THE INVENTION

1. Field of Invention

The present invention relates to an electroluminescent display, and a controller for controlling the intensity and operation of the electroluminescent (EL) display.

2. Description of Related Art

Traditional drive techniques for EL displays include high frequency sinusoidal alternating current (AC) or high voltage square pulses. The AC approach uses voltages between 80 and 135 Volts rms and frequencies between 800 and 1200 Hz. Unfortunately, this method offers only basic illumination without independent adjustment of intensity, e.g., between channels of an electroluminescent display. The alternating high voltage square pulse technique provides sophisticated control of the display but exposes the display to transients that may reduce its usable life.

An example of a control circuit can be found in U.S. Pat. No. 6,043,609 issued to George et al. The control circuit in this device includes a switch that is turned on and off so as to maintain a constant current level and frequency of the drive signal to the electroluminescent lamp substantially over its operating life. The voltage applied is allowed to increase to a predetermined limiting value in order to provide compensation due to aging of the lamp. However, George et al. does not address controlling intensity of individual channels or elements of an electroluminescent display.

Other prior art control circuits are disclosed in U.S. Pat. Nos. 5,814,947 and 5,293,098 issued to Brownell. These control circuits use an inverter to apply a full sinusoidal waveform to the electroluminescent display. Brownell accommodates switching on/off display elements by adjusting a base frequency based on the impedance of the lamp. However, adjusting base frequency disadvantageously shortens the display life and does not provide as significant an increase in illumination intensity as does an amplitude correction. Brownell does not address controlling intensity of individual display channels or elements of an electroluminescent display.

Yet another prior art control implementation is disclosed in U.S. Pat. No. 4,845,489 issued to Hormel. This control circuit compensates for the decrease in capacitance of an EL display by using an RC time constant which effectively increases the voltage presented across the EL display. Unfortunately, voltage increases generally must be applied across an entire EL display. Another disadvantage with direct voltage corrections is that once voltage has been increased to a maximum point, no further adjustment can be provided. Hormel does not control the intensity of individual channels or elements of an electroluminescent display.

In view of the foregoing, there is a need in the art for a controller for an EL display capable of adjusting the intensity of individual display channels or elements without disadvantageously shortening the life of the EL display. Additionally, there is a need for an EL controller which adjusts the intensity of individual channels or elements to individually compensate for lamp aging, color filters, and eye sensitivity to the color spectrum.

BRIEF DESCRIPTION OF THE INVENTION

The present invention comprises an electroluminescent display and controller for controlling the intensity of individual channels or elements of the electroluminescent display. The controller may be configured to control each channel or element of the electroluminescent display independent of the other display elements.

The electroluminescent display comprises a plurality of display elements (or channels), each having a first electrode and a second or common (shared) electrode, although the present invention is equally suitable for use with a display having a single display element. According to one embodiment of the invention, the display is used on a gaming device or a gaming apparatus, although the present invention may be used for any suitable application or device incorporating an electroluminescent display.

The means for controlling the intensity of each display element independent of other display elements comprises an EL controller. According to one illustrative embodiment, the controller comprises a processor, a half-wave waveform generator controlled by the processor, and a drive circuit controlled by the processor, that alternately applies the half-wave waveform to the first electrode and connects the second electrode to ground; and alternately applies the half-wave waveform to the second electrode and connects the first electrode to ground. Illumination of a display element occurs when the first and second electrode are "out of phase" as described in more detail below. Conversely, a display element is not illuminated when the first and second electrodes "are in phase".

The waveform generator provides a waveform to each element of the electroluminescent display as driven by the drive circuit and as dictated by the controller. In particular, the processor executes an illumination control algorithm to control the intensity of each of the display elements of the electroluminescent display by controlling/adjusting the number of "skipped cycles" in the "cycle set" of each waveform applied to a display element to thereby adjust the illumination intensity of the associated element. As described in more detail below, a skip cycle occurs when the first and second electrodes "are in phase".

According to one embodiment, a particular display element may have an associated preset number of skipped cycles (e.g., 10 cycles) in a cycle set (e.g., 16 cycles). The processor is able to increase the intensity of the display element by reducing the number of skipped cycles within the cycle set. Conversely, the processor is able to decrease the intensity of the display element by increasing the number of skipped cycles within the cycle set. By adjusting the overall duty cycle of the "cycle set" using cycle skipping, the electroluminescent display intensity adjustment is achieved without the limitations and disadvantages of prior art implementations (i.e., voltage adjustment across the entire EL display, base frequency adjustments).

According to the present invention, the cycle skipping method may be used for various applications utilizing intensity adjustments of electroluminescent displays including color compensation, display aging compensation, and display mode operation as described in more detail below. Additionally, selected display channels or elements may be emphasized by increasing the illumination intensity of the selected channels while reducing the illumination intensity of non-selected channels. It will be appreciated by those skilled in the art having the benefit of this disclosure that other applications for adjusting the intensity of an electroluminescent display are equally suitable and are within the scope of the present invention.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Preferred embodiments of the present invention are shown in the accompanying drawings wherein:

FIG. 6 is substantially a side-by-side comparison of timed activation of the field effect transistors of the circuit shown in FIG. 5.

DESCRIPTION OF THE PREFERRED EMBODIMENT

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
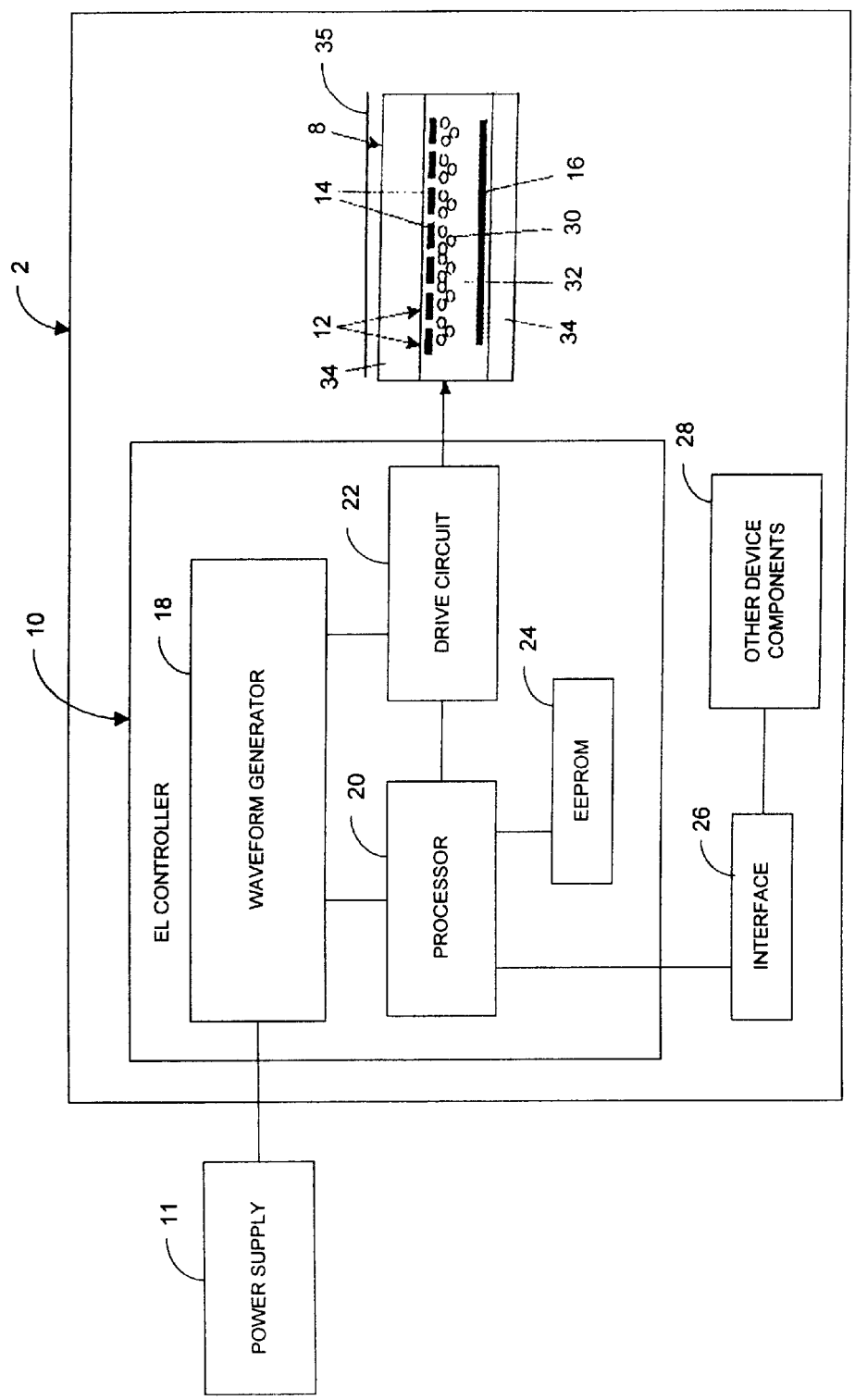
FIG. 1 is substantially a block diagram of a device including an electroluminescent display and an EL controller in accordance with the present invention.

Referring to FIG. 1, the present invention comprises a device 2 including an electroluminescent (hereinafter "EL") display 8 and an EL controller 10 for controlling the illumination intensity of multiple display channels or elements 12 of EL display 8. The term "intensity," as used herein, indicates a brightness of light emitted by a respective display element. Device 2 can be any machine in which an EL display is used, e.g., an electronic game, an electronic device, peripheral, kiosk, etc. EL display 8 includes, inter alia, multiple first electrodes 14, each having an EL display element 12, and a second 10 common electrode 16. As will be described in more detail below, EL controller 10 includes a half-wave waveform generator 18, a processor 20 and a drive circuit 22. Electrically erasable programmable read-only memory (EEPROM) 24 may also be provided (e.g., for storing instructions carried out by the processor 20).

Drive circuit 22, under control of processor 20, is configured to alternately apply the half-wave waveform to first electrode 14 of EL display element 12 and connect the second electrode 16 to ground and alternately applying the half-wave waveform to a second common electrode 16 and connecting first electrode 14 to ground. An EL display element 12 is illuminated when first and second electrodes 14 and 16 are out of phase. EL controller 10 may be powered by a single power supply 11 (e.g., 24 V) making it independent of power source and easily integrated into systems designed for the international market. EL controller 10 may also be coupled to an interface 26 for communication with other device components 28. Other device components 28 may be any other components under control of processor 20. For instance, if device 2 is an electronic game, other device components 28 may be gaming peripherals (e.g., display devices, input controls, speakers) or gaming systems (e.g., network server or progressive server).

With continuing reference to FIG. 1, each EL display element 12 comprises a phosphor material 30 sandwiched between a front or first electrode 14 and a common or second electrode 16. Electrodes 14, 16 are isolated by a dielectric 32. The actual phosphor material can be any well known phosphor material, for example, calcium phosphate phosphor, and may vary according to the user's desired color, phosphorescence, effect, etc. First electrode 14 is typically constructed of a transparent material such as a transparent indium tin oxide (ITO). Further, first electrode 14 is also preferably shaped to evenly illuminate foreground graphics.

First and second electrodes 14, 16 are built on sheets of transparent material 34 such as glass or MYLAR to form a very thin, lightweight and inexpensive display. While EL display 8 is shown in cross-section, one with skill in the art will recognize that display elements 12 can be organized in a row/column configuration for use as a dot matrix display. As will be described further, each EL display element 12 operates on a principle of successive pulses of opposite polarity relative to electrodes 14, 16. These pulses must exceed an illumination threshold, for example, approximately 200V, for an EL display element 12 to emit light, depending on the phosphor material 30 used.

Additionally, one or more color filters 35 may be applied onto the surface of EL display 8 to correspond to specific display elements 12. The color filter 35 is used to narrow the EL display emission to a specific color frequency (e.g., yellow, green, red). In this way, the display elements 12 of EL display 8 may have corresponding specific colors (e.g., yellow, green, red). As a consequence, the filters 35 reduce the intensity of transmitted light. As will be described in more detail below, the present invention provides intensity control/adjustment of individual channels or elements 12 to compensate for the reduced intensity when such color filters 35 are implemented and/or according to the phosphor material 30 used.

In accordance with the present invention a synthesized full waveform is applied across selected electrodes to illuminate a display element 12. In particular, a method of controlling intensity of EL display elements 12 in accordance with the invention includes providing a half-wave waveform (e.g., a haversine), such as that created by half-wave waveform generator 18, that is alternately applied to first electrode 14 while connecting the second electrode to ground, and alternately applied to second, electrode 16 while connecting the first electrode 14 to ground. This alternate application is made under control of processor 20, as will be described in more detail below. Use of a half-wave waveform is advantageous because it allows EL controller 10 to be constructed of more readily available and less expensive components than used in systems that initially create full waveforms. For example, EL controller 10 uses components rated for 200 V to create a half-wave waveform capable of a 400 V full wave, as opposed to using components to create the 400 V full waveform.

Figure 2:
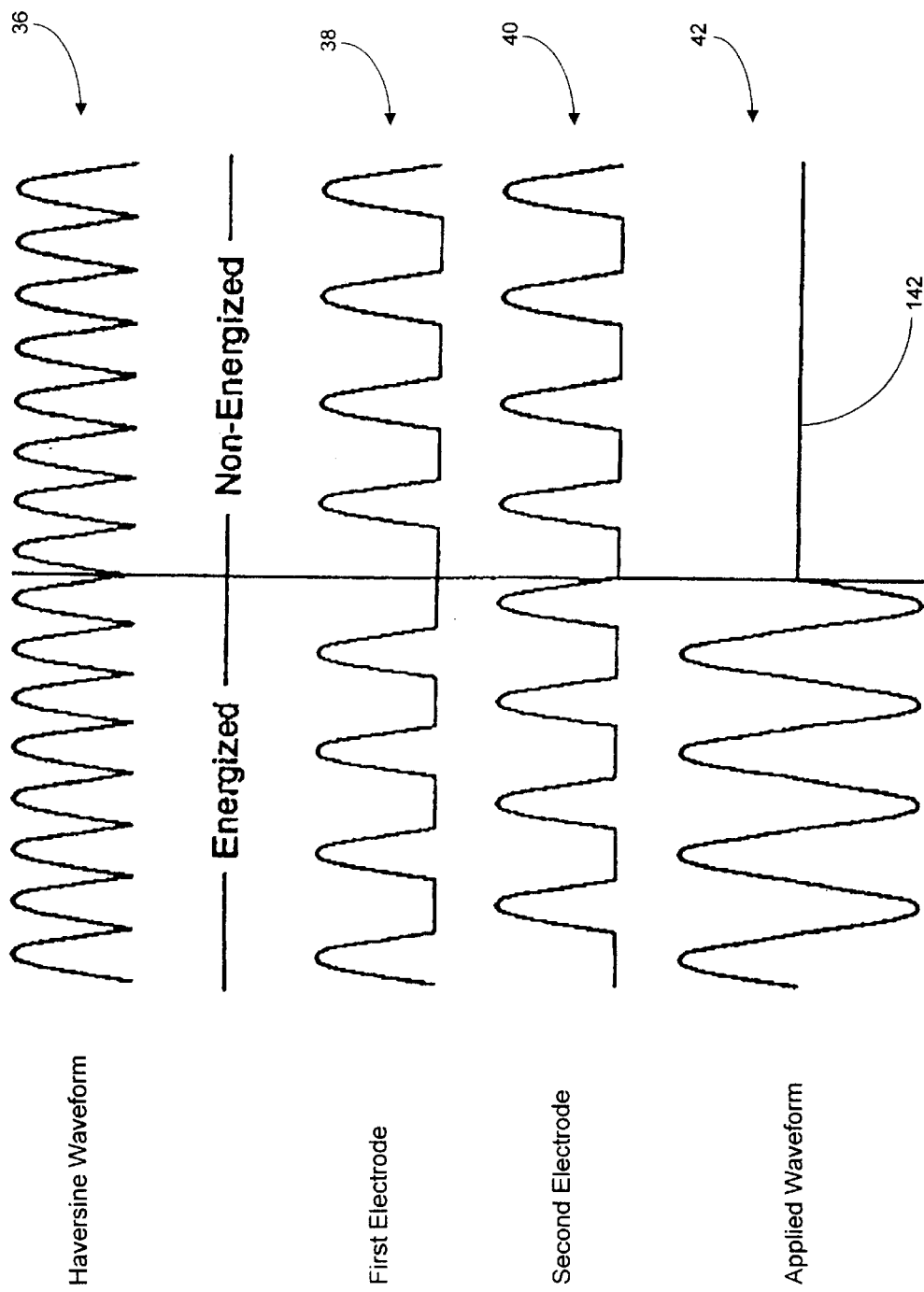
FIG. 2 is substantially a side-by-side comparison of waveforms of the present invention.

Referring next to FIG. 2, a side-by-side comparison of waveforms of the present invention is shown. In one preferred embodiment, the half-wave waveform is a haversine waveform 36. Haversine waveform 36 is created by haversine waveform generator 18. As indicated, when the portions of the haversine waveforms (designated 38, 40) are applied to electrodes 14, 16 out of phase (left side of FIG. 2), EL display element 12 receives a substantially sinusoidal waveform (applied waveform 42) that is double the half-wave waveform and is energized, i.e., illuminated. By way of example, the electrode 14, 16 are out-of-phase when the waveform is applied to first electrode 14 during a first half of a cycle (while connecting the second electrode 16 to ground during the first half of a cycle), and When the waveform is applied to second electrode. 14 during a second half of the cycle (while connecting the first electrode 14 to ground during the second half of the cycle).

An illumination threshold for applied waveform 42 may be, for example, approximately 200V. In contrast, when the waveforms 38, 40 applied to electrodes 14, 16 are in phase (right side of FIG. 2), EL display element 12 receives a substantially cancelled waveform (applied waveform 142) that does not exceed the threshold voltage and is non-energized, i.e., not illuminated.

Direct adjustment of intensity determining factors such as amplitude and/or base frequency of an applied full waveform is known to provide a way to control illumination intensity over the life of EL display element 12. As noted above, however, adjustment of voltage and, especially, base frequency causes other disadvantageous results. For instance, adjustment of frequency does not provide the same results as adjusting voltage and shortens EL display life. Increasing voltage is disadvantageous because it generally must be applied across the entire EL display. As a result, once an EL display has its voltage increased to a maximum amount, no further adjustment is possible. In accordance with the invention, use of half-wave waveforms allows control of the relative phase of electrodes 14, 16 within a cycle set, and, as a result, the duty cycle (or average voltage within the cycle set) of the associated full waveform applied to individual display elements 12, as opposed to the entire EL display 8 (although that is possible also).

In accordance with the invention, adjustment of the intensity of EL display 8 is provided by interposing "skip cycles" in a cycle set of the waveform applied to corresponding display elements 12. In particular, skipping of at least one cycle of half-wave waveforms 38, 40 to at least one of the first and second electrode 14, 16 is used to control illumination intensity of display elements 12. "Skipping cycle," as used herein, means skipping a cycle in a "cycle set" of the waveform, which is the principal frequency of the waveform, i.e., without averaging. Preferably, cycle skipping is carried out at zero-crossing, voltage points. Dynamically changing skip cycles provides a way to adjust the intensity of individual display elements 12 by controlling their respective duty cycles. In one embodiment, a half-wave waveform includes a preset number of skipped cycles, e.g., 10. In this way, the intensity of a respective a display element 12 may be increased or decreased. Each EL display element 12 can then be treated independently by controlling the applied waveform to their respective first electrode 14. For example, intensity may be balanced or individual channels may be dimmed for special effect or special operating mode (e.g., attract mode, play mode, etc.). Skipping cycles is also beneficial to compensate for manufacturing variations in channel intensity and life degradation associated with uneven use of the various channels. Furthermore, where color overlays are used, or various phosphor materials 30 are used, different density graduations and/or different colors can cause unexpected intensity variations. The use of customized skipped cycles for each display element allows compensation for the different density and/or color overlays or phosphor material. Skipped cycles may also be used to vary the channel intensity of according to particular mode of operation. For example, medium intensity may be used during normal operation, and high intensity may be used for attract mode or to indicate an award or payline for a game, such as a gaming machine (e.g., slot machine). Another example where channel intensity variation is desired arises where it is desirable to emphasize particular channel(s) (e.g., a payline, or a win amount). In such cases, the designated channels may be provided a higher illumination intensity (by removing associated skip cycles) and the non-designated channels may be provided a lower illumination intensity (by adding associated skip cycles), thereby creating greater contrast between designated and non-designated channels or display elements.

The nominal sinusoidal frequency applied to EL display element 12 is preferably about 1000 Hertz (Hz). Since flicker rate of the human eye is near about 60 Hz, this imposes a lower limit of 16 cycles for the skip period or cycle set, i.e., 1000/60. Other cycles are also possible. Using a 16-cycle interval provides an approximately 6.25% intensity resolution assuming that intensity is linearly related to duty cycle. The eye can perceive much smaller changes limiting low-end rate of change for dynamic adjustments.

Figure 3:
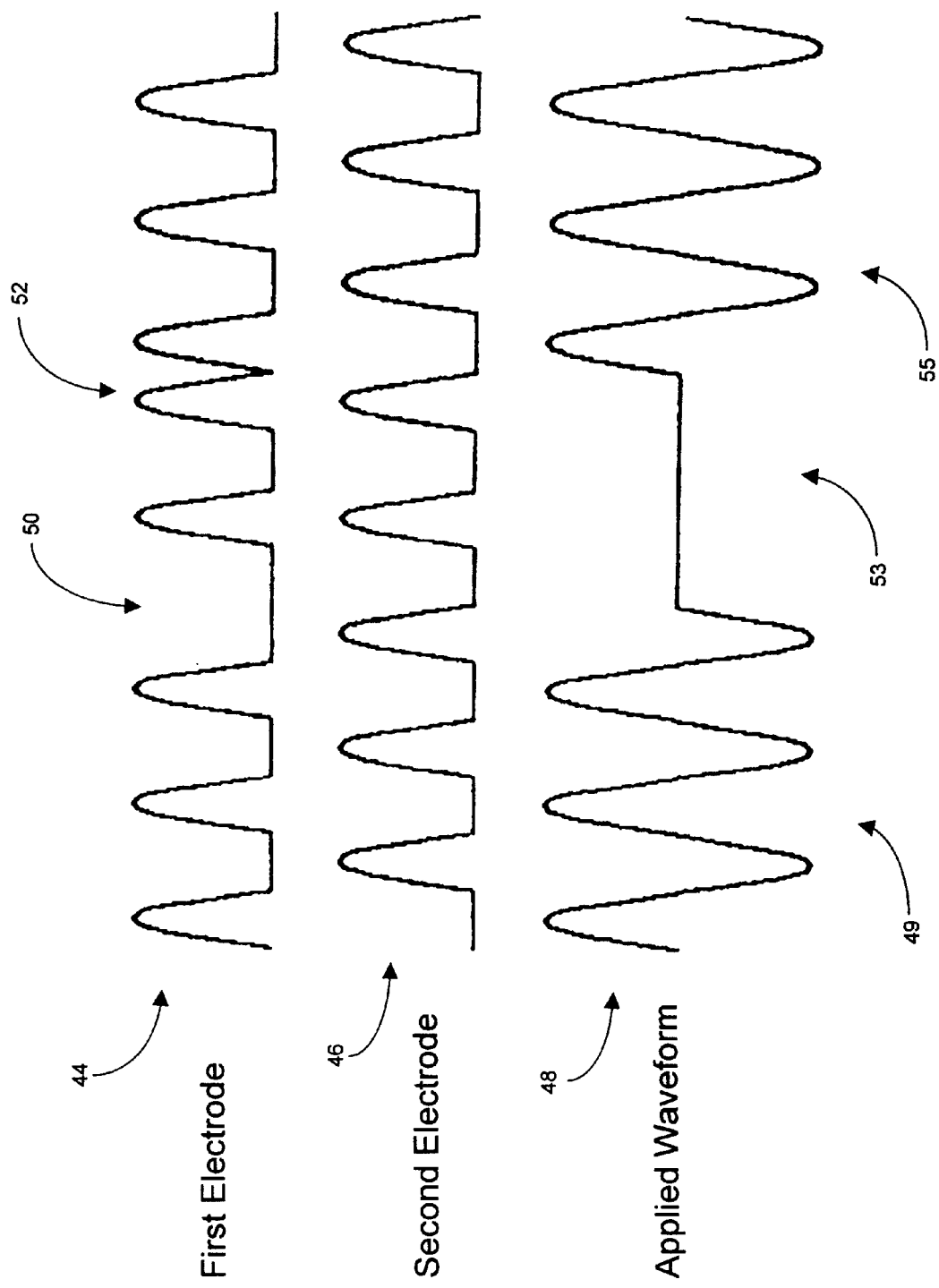
FIG. 3 is substantially a side-by-side comparison of skipped cycle waveforms.

Referring now to FIG. 3, a side-by-side comparison of the application of skipped cycle waveforms is shown in accordance with the present invention. Cycle skipping is accomplished by "synchronizing" (applying respective waveforms in phase to) the first and second electrodes 14, 16 for the desired number of skipped cycles. In the example sinusoidal frequency of 1000 Hz, this is implemented over a period of 16 cycles (cycle set) to avoid the eye flicker rate as discussed above. This provides 16 discrete intensity levels. As shown, when first electrode waveform 44 and second electrode waveform 46 are out of phase, an applied waveform 48 is created, which energizes EL display element 12, depicted at 49. A skip cycle 50 may be initiated in, e.g., first electrode waveform 44, to temporarily place waveform 44 and second electrode waveform 46 in phase. Since the waveform applied to the first electrode 14 is substantially cancelled by the applied waveform to the second electrode 16, the applied signal during in phase operation is thereby substantially cancelled, and, hence, EL display element 12 is not energized at 53. A skip cycle correction 52 places the applied waveform to electrodes 14, 16 out of phase and returns the applied waveform to the energized state at 55. By controlling these skip cycles 50, the illumination intensity of an EL display element 12 may be controlled.

Referring now to FIGS. 4–7, details of preferred embodiments of EL controller 10 components will be described. It should be recognized that there are a variety of techniques that can be used to accomplish the waveform generation discussed in the previous section. The following paragraphs discuss various implementations to serve as examples and to provide a more clear understanding of the fundamental concepts.

Figure 4:
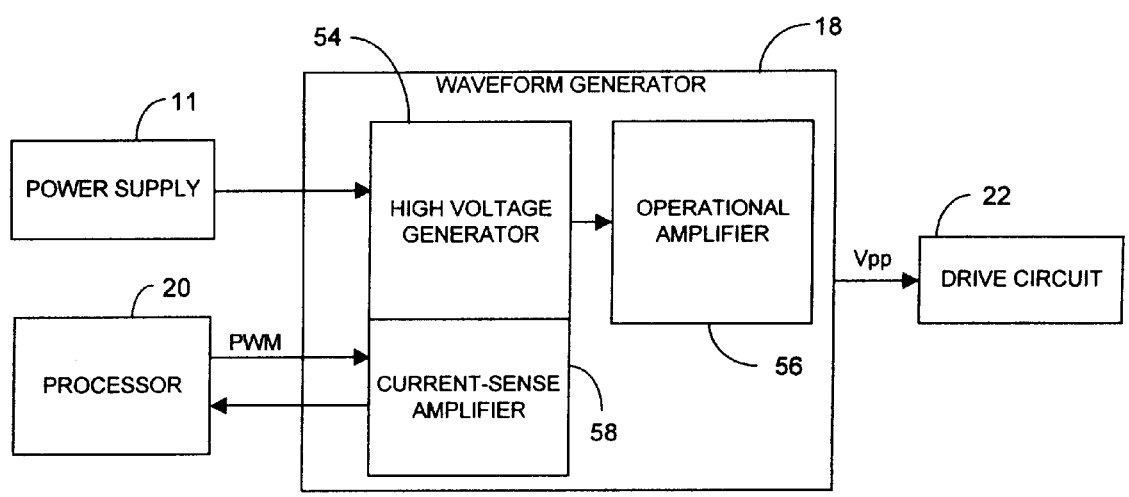
FIG. 4 is substantially a block diagram of a half-wave waveform generator in accordance with the present invention.

Turning to FIG. 4, an illustrative half-wave waveform generator 18 used to create the half-wave waveform for EL display 8 is shown in greater detail. In the example embodiment illustrated, generator 18 includes a high voltage DC-DC generator 54 and a high voltage operational amplifier 56. Generator 54 produces DC voltage in the range of 100 to 190 V, preferably about 185 V depending on the materials used in the EL display 8, from a +24 V power supply 11 using, for example, a switching regulator, cascode FET driver and a voltage trippler (not shown). The output is controlled by a D-A converter, the output of which is summed with the feedback voltage into the switching regulator. The D-A converter includes a pulse width modulated (PWM) signal from processor 20 driving an RC circuit which is buffered by an operational amplifier. Operational amplifier 56 creates a half-wave waveform (Vpp)(rectified AC waveform) from the high voltage DC potential under control of the processor's PWM signal. The full waveform is generated by processor 20 firmware directing drive circuit 22.

A high voltage current sense amplifier 58 may also be provided to sense the voltage drop across a resistor (e.g., 0.2 ohm) in series with generator 54. The output of sense amplifier 58 is filtered and amplified by an op-amp circuit (not shown) before being presented to processor 20 A-D input. The current sense amplifier 58 may be used, for example, to determine whether a short has occurred across a display element 12 (e.g., where the current sensed by current sense amplifier 58 exceeds a tolerance value). In this way, the controller 10 is able to terminate operation for a particular display element 12 before damaging the power supply 11. Additionally, the controller 10 may continue to operate other display elements, while the faulty display elements are terminated, if so desired (e.g., depending on the which display element (critical or non-critical) fails).

Besides the before-mentioned lower cost and ready availability of EL controller 10 and, in particular, generator 18 components, an additional advantage of the particular components used for the above-described generator 18 is that they allow for easy changing of the type of half-wave waveform. In particular, no new components are necessary to change from a haversine to a triangular half-wave.

Figure 5:
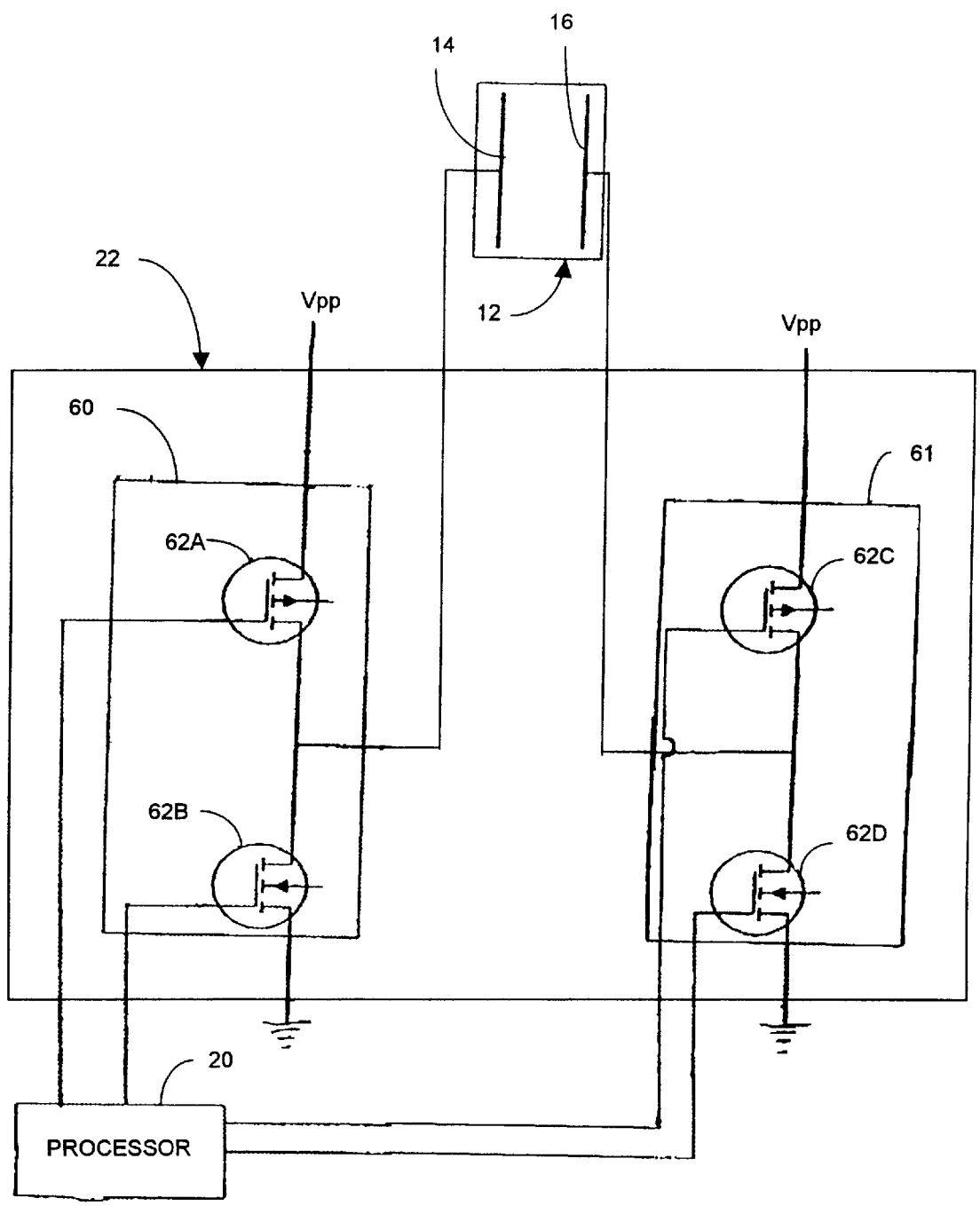
FIG. 5 is substantially a schematic of embodiments of a drive circuit.

FIG. 5 is a schematic of drive circuit 22 suitable for use with the present invention. Only one display element 12 is shown for simplicity. In one embodiment, drive circuit 22 includes two circuits: a multiple channel driver 60 and a common electrode driver 61. Multiple channel driver 60 may include a channel for each first electrode 14/display element 12 of EL display 8. If display elements 12 can be grouped without diminishing their usefulness, the number of channels may be reduced.

In one exemplary situation, multiple channel driver 60 includes 32 channels for control of up to 32 display elements 12, or group of display elements. Each channel includes a pair of switches, e.g., field effect transistors (FETs), 62A, 62B. Each first electrode 14 is connected between the junction of a respective set of switches 62A and 62B. Under control of processor 20, FETs 62A, 62B supply individual first electrode(s) 14 with either the half-wave waveform Vpp from generator 18 or ground.

Common electrode driver 61 includes a pair of switches, e.g., field effect transistors (FETs), 62C 62D. Common electrode 16 is connected between the junction of switches 62C and 62D. Under control of processor 20, FETs 62C, 62D supply common electrode 16 with either the half-wave waveform Vpp from generator 18 or ground. An invert signal may be provided from processor 20 to invert signals simultaneously. Hence, processor 20 operates to control activation of switches 62A–62D.

For a simplified EL display 8, i.e., one with fewer display elements 12, a second embodiment of drive circuit 22 may include a switched bridge including two pairs of switches. In this case, the switched bridge would schematically look very similar to drive circuit 22 shown in FIG. 5, except that the contacts to generator 18 and ground need not be separate contacts for each pair of switches 62A, 62B and 62C, 62D. The switched bridge would include a first FET 62A coupled to generator 18 and to first electrode 14; a second FET coupled to ground and to first electrode 14; a third FET coupled to generator 18 and to common electrode 16; and a fourth FET coupled to ground and to common electrode 16.

In operation, during the first half of the resultant full wave cycle, all channels that are on are supplied with the half-wave waveform Vpp, all channels that are off are grounded, and the common electrode is grounded. During the second half of the resultant full wave cycle, all channels that are on are grounded, and the common electrode and all channels that are off are supplied with the half-wave waveform Vpp. In other words, channels that are on are driven out-of-phase with respect to the common electrode, while the off channels are driven in-phase. When applied, a display element 12 sees a full wave that is twice the level of the half-wave waveform Vpp, exceeding the threshold illumination and energizing/illuminating the corresponding display element.

Referring to FIG. 6, a side-by-side comparison of an exemplary timed activation of drive circuit 22 switches 62A–62D illustrating a portion (8 cycles) of a 16-cycle cycle set is shown (each cycle comprising two time periods T). At the start of the cycle, all of switches 62A–62D are in the off state. At time (T0), switches 62A and 62D are turned on connecting first electrode 14 of EL display element 12 to waveform generator 18 and common electrode 16 to ground. At time (T1), switches 62A and 62D are turned off and switches 62B and 62C are turned on, connecting generator 18 to common electrode 16 and first electrode 14 to ground. This sequence is repeated through time (T7) and results in an illuminated EL display element 12. At time (T8), switch 62C is turned off and switch 62D is turned on. This connects both electrodes 14, 16 of EL display element 12 to ground. At time (T9), switches 62B and 62D are turned off and switches 62A and 62C are turned on. This connects both electrodes 14, 16 of EL display element 12 to generator. 18. This sequence may be repeated through time (T15) and results in a non-illuminated EL display element 12. That is, whenever both electrodes 14, 16 are connected to generator 18 or ground, EL display element 12 is not illuminated. The resultant waveform comprises four (4) "on" cycles and four (4) skip cycles (50% duty cycle).

Figure 6A:
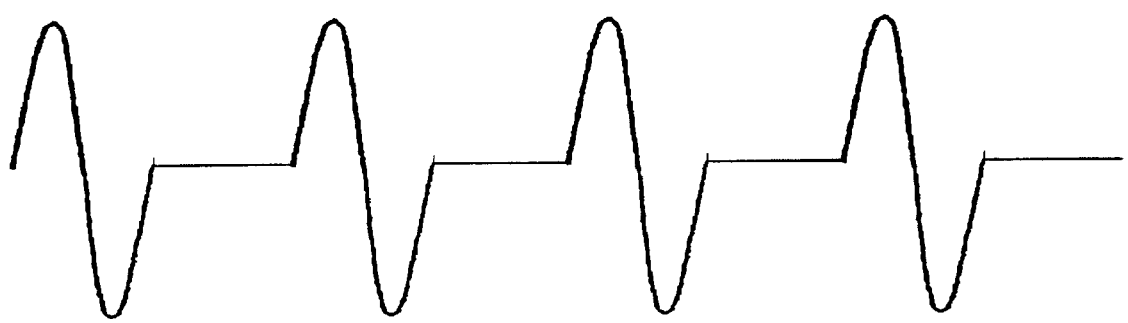
FIG. 6*a* illustrates another example waveform having a duty cycle of fifty percent in accordance with the present invention.

Referring next to FIG. 6a, another preferred embodiment of the invention would distribute the "skipped cycles" evenly within the cycle, as depicted by the applied waveform of FIG. 6a (also a 50% duty cycle). When the skipped cycles are distributed more evenly within the cycle set, rather than grouped together from T8 to T15, the EL display is less likely to produce noticeable flicker.

Figure 7:
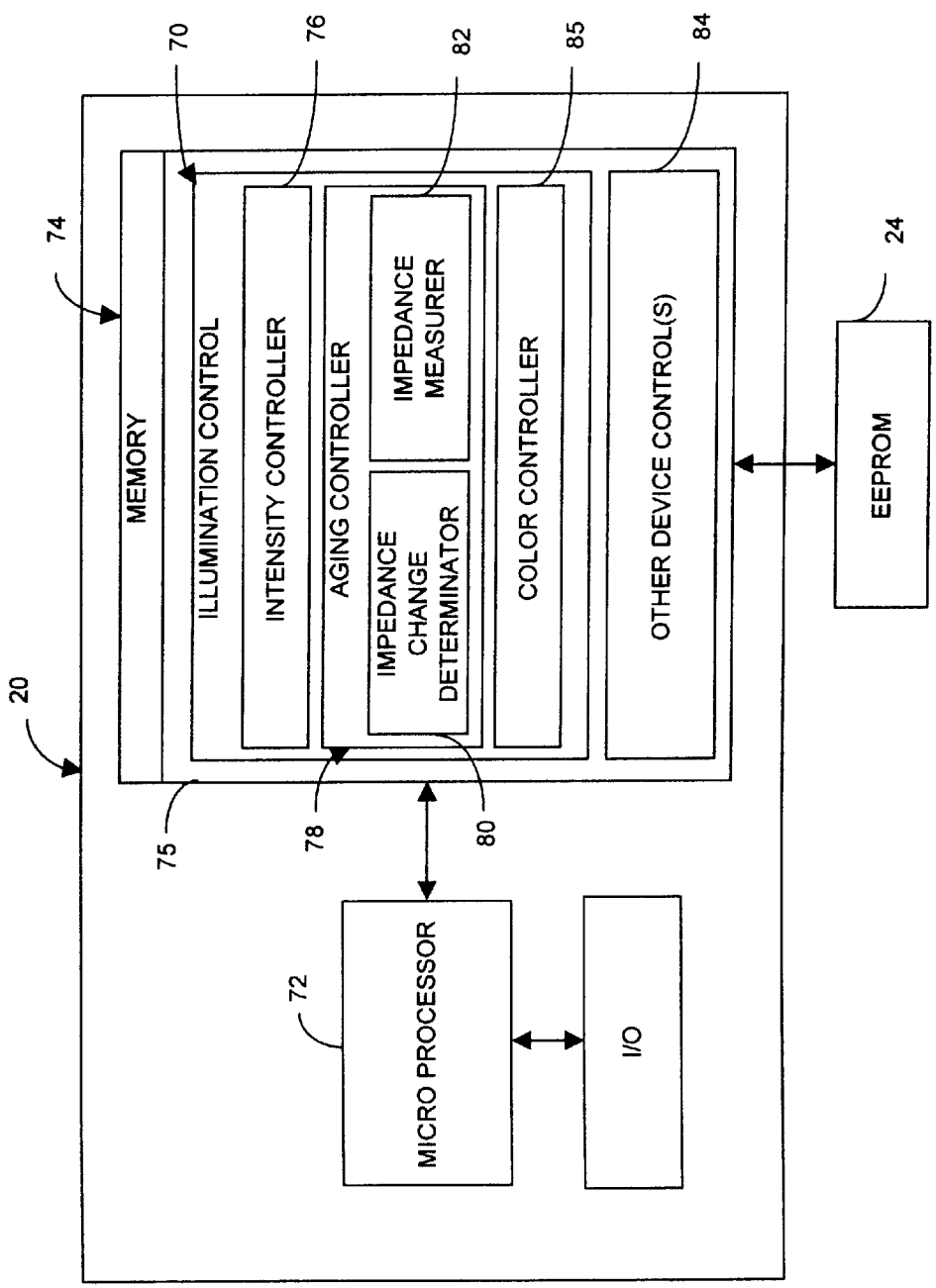
FIG. 7 is substantially a block diagram of a processor having an illumination control.

Turning to FIG. 7, details of processor 20 are illustrated. Processor 20 generally comprises a processor board having a microprocessor 72 and a memory 74. Microprocessor 72 may, for example, comprise a PIC16C77 processor form Microchip™. Memory 74 preferably includes a program product 75 that, when executed by microprocessor 72, controls illumination of EL display 8 as will be described below. Memory 74 may comprise any known type of data storage system and/or transmission media, including random access memory (RAM), read only memory (ROM), magnetic media, optical media, network media, etc. Moreover, memory 74 may reside at a single physical location comprising one or more types of data storage, or be distributed across a plurality of physical systems via a network infrastructure (not shown). EEPROM 24, or other data storage systems, may provide the program product 75 executed by processor 20. Microprocessor 72 may likewise comprise a single processing unit, or a plurality of processing units distributed across device 2. Input/outputs (not shown) of processor 20 may comprise any known type of input/output device including a network system, modem, keyboard, mouse, scanner, voice recognition system, CRT, printer, disc drives, etc. Additional components, such as cache memory, communication systems, system software, etc., may also be incorporated into processor 20.

Program product 75 includes an illumination control 70 that is capable of accessing and implementing a wide range of predetermined display routines for EL display 8. These routines implement the general activities of EL display 8 such as illuminating, blinking, dimming, cycling, eye-catching effects, etc. These display routines are stored in memory of EL controller 10, e.g., EEPROM 24. More particularly, Illumination control 70 controls illumination intensity using an intensity controller 76 which provides the instructions for providing cycle-skipping in accordance with the present invention.

An aging controller 78 may also be included with illumination control 70 to compensate intensity for aging of display elements 12. Aging controller 78 includes an illumination change determinator 80 and an impedance measurer 82. Memory 74 may also include other device controls 84 for controlling other aspects of device 2. For instance, if the device 2 is an electronic game, other gaming activity controls may be stored in memory 74. Illumination control 70 further includes a color controller 85 to provide color compensation for the EL display 8.

Turning to the details of illumination control 70, intensity controller 76 is operative to adjust an intensity determining factor for each display element 12 independently of other display elements. This adjustment may be made in response to the aging controller 78, the color controller 85, aspects of the aforementioned predetermined display routines, and/or a user's manual adjustment (via any common system interface). In accordance with the invention, the intensity determining factor is preferably a number of skipped cycles interposed in a cycle set of a waveform. The intensity determining factor can be adjusted for each display element 12 independently of other display elements by varying the number of skipped cycles per display element independently. It should be recognized that the intensity determining factor may also include a combination of an adjustment in the number of skipped cycles, and an adjustment of an amplitude of the waveform and/or a base frequency of the waveform applied to all display elements 12. However, the latter two adjustments affect every display element 12. Furthermore, it should be recognized that use of illumination control 70 relative to intensity control should not be limited to use with a half-wave waveforms, as described above. That is, skipped cycles may be interposed in a cycle set of any prior art device to achieve the advantages of the present invention.

In terms of skipped cycles, in one preferred embodiment mentioned above, a predetermined number of skipped cycles are interposed in a cycle set of the waveform during manufacture or setup of EL display 8 using illumination control 70. For example, twelve (12) skip cycles may be interposed at the outset of operation for each display element 12. The intensity determining factor can then include one or more additional skipped cycles interposed to reduce illumination intensity, or removal of one or more skipped cycles to increase illumination intensity. Where 16 cycles are present in the cycle set, intensity can be decreased up to four levels (adding a $13^{th}$ through $16^{th}$ skipped cycle) or increased up to 11 levels (removing a 1–10 cycles).

In this way, intensity controller 76 may control the number of skipped cycles to control special effects within an EL display 8. For instance, using skipped cycles, intensity controller 76 may provide display elements 12 of various intensity within a single multiple element 12 of EL display 8. Furthermore, special effects such as dimming of elements 12 are possible. Moreover, intensity controller 76 can balance the intensity of individual elements 12 of the display 8. For example, where color overlays are used with EL display 8 that have inconsistent color density, illumination intensity can be controlled to compensate for inconsistencies. It is noted that the number of skipped cycles interposed at the outset is arbitrary and dependent on the specific implementation; twelve skipped cycles is provided herein only by way of illustration.

Turning to the details of aging controller 78, in accordance with the invention, an initial element impedance for each EL element 12 is stored in a memory, e.g., EEPROM 24. This initial element impedance may be established by impedance measurer 82 at, for example, the time of manufacture of device 2, powering up of device 2, or any other convenient point. Impedance measurer 82 periodically measures an existing element impedance of each EL display element 12. From the initial element impedance and the existing element impedance, impedance determinator 80 determines an element impedance change for each EL display element 12. Since impedance is proportional to the illumination capability of an EL display element, element impedance change indicates the depreciation in illumination intensity of an EL display element due to aging, among other things. From the impedance change, intensity controller 76 can adjust the intensity determining factor to compensate for the aging, e.g., by increasing the intensity by removing one or more skipped cycles associated with the display element. As would be readily apparent to one skilled in the art having the benefit of this disclosure, aging of display elements may also be determined by measuring a change in capacitance. For instance, a simple method may utilize an RC time constant ($Vout=Vin(1-e^{(-t/rc)})$). By measuring the capacitance of an element using a fixed voltage source and a series resistance, the capacitance may be calculated by measuring the time required to charge the element capacitance.

In one embodiment, intensity controller 76 may access a lookup table (not shown) that includes element impedance versus illumination intensity data to determine the illumination intensity adjustment required to accommodate the impedance change indicated by aging controller 78. Intensity controller 76 can then adjust the intensity determining factor to increase the intensity appropriately, e.g., add/remove skipped cycles. In a second embodiment, where impedance versus illumination intensity data can be mathematically solved, intensity controller 76 may implement an algorithm that solves for an illumination intensity determining factor based on impedance change and a desired illumination intensity. Since a variety of factors other than the intensity of the display element itself (e.g., color overlays) ultimately determine intensity, a number of lookup tables and/or algorithms may be implemented for each unique situation. Intensity controller 76 could then implement a determination of what intensity effecting parameters are present (e.g., color overlays, aged display elements, etc.) and use an appropriate lookup table and/or algorithm. If necessary, combinations of intensity determining factors may be required, e.g., use an increased voltage for all display elements because of aging and skip cycles to create a special effect in particular display elements.

In an alternative embodiment, impedance change determinator 80 may simply be implemented using a time-in-use measurement to determine an expected drop in illumination intensity. In other words, rather than measure impedance directly, a time-in-use for each display element 12 may be maintained. Lookup table(s) or algorithm(s) could then be provided to correlate time-in-use versus illumination intensity depreciation so that an appropriate intensity determining factor could be implemented.

In the above described system and methodology, it will be understood that the method steps discussed preferably are performed by a processor, such as microprocessor 72, executing instructions of program product 75 stored in memory. It is understood that the various devices, modules, mechanisms and systems described herein may be realized in hardware, software, or a combination of hardware and software, and may be compartmentalized other than as shown, such as via an embedded system incorporating logic circuitry configured to carry out the cycle skipping operation (e.g., field programmable gate array (FPGA) or application-specific integrated circuit (ASIC)). The present invention may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

Accordingly, the present invention solves many of the problems associated with the prior art. The present invention eliminates high frequency components present in traditional digital electroluminescent controllers and provides a controller that may control the nominal intensity of the display. The present invention provides a controller that can adjust individual channel intensity, dim individual channels to add dimensionality to the display and balance the intensity of individual channels of the display. The present invention also provides a controller operable from a single 24 volt supply making it independent of power source.

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. An intensity controller for an electroluminescent display having a first electrode and a second electrode, the intensity controller comprising:
    a processor;
    a waveform generator controlled by the processor configured to generate a waveform signal;
    a drive circuit controlled by the processor and coupled to said waveform generator, said drive circuit configured to receive said waveform signal from said waveform generator and generate a substantially sinusoidal waveform across said first and second electrode to illuminate the electroluminescent display, said sinusoidal waveform further comprising a cycle set having a plurality n of cycles, and
    an intensity controller executed by said processor, said intensity controller configured to adjust an illumination intensity of said electroluminescent display by adding or removing at least one skip cycle in said cycle set.

2. The intensity controller of claim 1, wherein a number of non-skip cycles to the number of cycles in said cycle set establishes an overall duty cycle for said cycle set.

3. The intensity controller of claim 1, wherein said skip cycle is a substantially cancelled cycle.

4. The intensity controller of claim 1, further comprising an aging controller executed by said processor configured to:
    determine a change in impedance of said electroluminescent display; and
    adjust said illumination intensity if said change,in impedance exceeds a threshold value by removing at least one skip cycle in said cycle set.

5. The intensity controller of claim 1, further comprising an aging controller executed by said processor configured to:
    determine a change in capacitance of said electroluminescent display; and
    adjust said illumination intensity if said change in capacitance exceeds a threshold value by removing at least one skip cycle in said cycle set.

6. The intensity controller of claim 1, wherein said cycle set includes an initial number m of skipped cycles, said intensity controller further comprising a color compensation controller executed by said processor configured to color adjust said illumination intensity by adding or removing at least one skip cycle in said cycle set.

7. The intensity controller of claim 6, wherein said electroluminescent display comprises a color filter, said color compensation controller configured to adjust said illumination intensity by removing at least one skip cycle in said cycle set.

8. The intensity controller of claim 1 further comprising a power supply configured to provide a DC voltage and a ground, said power supply coupled to said waveform generator, said waveform generator further configured to generate a half-wave waveform from said DC voltage, said drive circuit configured to apply said half-wave waveform in phase during a skip cycle.

9. The intensity controller of claim 8, wherein said drive circuit is further configured to apply said half-wave waveform out of phase during non-skip cycles.

10. The intensity controller of claim 8, wherein said drive circuit is further configured to apply said half-wave waveform in phase for the entire cycle set to cancel illumination of said electroluminescent display during an off state.

11. The intensity controller of claim 9, wherein each cycle within said cycle set comprises a first and second half, said drive circuit further configured to:
apply said half-wave waveform out of phase by applying the half-wave waveform to the first electrode and connect said second electrode to said ground during the first half of a designated cycle; and
apply the half-wave waveform to the second electrode and connect said first electrode to said ground during the second half of said designated cycle.

12. The intensity controller of claim 8, wherein each cycle within said cycle set comprises a first and second half, said drive circuit further configured to:
connect said first electrode and said second electrode to said ground during said first half of a designated cycle; and
apply said half-wave waveform in phase by applying the half-wave waveform to the first electrode and to the second electrode during said second half of said designated cycle.

13. The intensity controller of claim 1, wherein electroluminescent display further comprises an illumination threshold, said sinusoidal waveform further comprising a voltage amplitude exceeding said illumination threshold of said electroluminescent display.

14. The intensity controller of claim 1, wherein said sinusoidal waveform comprises a frequency of 1000 Hz and said cycle set comprises 16 cycles.

15. An intensity controller for an electroluminescent display having a plurality of channels, each channel having a first electrode and sharing a common second electrode, the intensity controller comprising:
a processor;
a waveform generator controlled by the processor configured to generate a
waveform signal;
a multiple-channel drive circuit controlled by the processor and coupled to said waveform generator, said drive circuit configured to receive said waveform signal from said waveform generator and generate a substantially sinusoidal waveform across each said first and second electrode to illuminate each respective channel of the electroluminescent display independently, said sinusoidal waveform further comprising a cycle set having a plurality n of cycles, and
an intensity controller executed by said processor, said intensity controller configured to adjust an illumination intensity of each said channel of said electroluminescent display by adding or removing at least one skip cycle in said cycle set applied to said respective channels.

16. The intensity controller of claim 15, wherein a number of non-skip cycles to the number of cycles in said cycle set establishes an overall duty cycle for said cycle set.

17. The intensity controller of claim 15, wherein said skip cycle is a substantially cancelled cycle.

18. The intensity controller of claim 17, further comprising an aging controller executed by said processor configured to:
determine a change in impedance of each said channel in said
electroluminescent display; and
adjust said illumination intensity of a channel if said change in impedance exceeds a threshold value by removing at least one skip cycle in said cycle set applied to said channel.

19. The intensity controller of claim 17, further comprising an aging controller executed by said processor configured to:
determine a change in capacitance of each said channel of said electroluminescent display; and
adjust said illumination intensity of a channel if said change in capacitance exceeds a threshold value by removing at least one skip cycle in said cycle set applied to said channel.

20. The intensity controller of claim 15, wherein said cycle set includes an initial number m of skipped cycles, said intensity controller further comprising a color compensation controller executed by said processor configured to color adjust said illumination intensity by adding or removing at least one skip cycle in said cycle set.

21. The intensity controller of claim 20, wherein at least one of said channel of said electroluminescent display comprises a color filter, said color compensation controller configured to adjust said illumination intensity of said channel by removing at least one skip cycle in said cycle set.

22. The intensity controller of claim 20, wherein said color compensation controller further comprises a lookup table for each channel, said lookup table defining initial operating parameters for each said channel, said color compensation controller configured to adjust said illumination intensity by adding or removing at least one skip cycle in said cycle set in accordance with said initial operating parameters.

23. The intensity controller of claim 22, further comprising an aging controller executed by said processor configured to:
determine a change in capacitance of each said channel of said
electroluminescent display; and
adjust said illumination intensity of a channel if said change in capacitance exceeds a threshold value by removing at least one skip cycle in said cycle set applied to said channel.

24. The intensity controller of claim 15 further comprising a power supply configured to provide a DC voltage and a ground, said power supply coupled to said waveform generator, said waveform generator further configured to generate a half-wave waveform from said DC voltage, said drive circuit configured to apply said half-wave waveform in phase during a skip cycle.

25. The intensity controller of claim 24, wherein said drive circuit is further configured to apply said half-wave waveform out of phase during non-skip cycles.

26. The intensity controller of claim 8, wherein said drive circuit is further configured to apply said half-wave waveform in phase for the entire cycle set to designated off state channels of said electroluminescent display.

27. The intensity controller of claim 25, wherein each cycle within said cycle set comprises a first and second half, said drive circuit further configured to:
apply said half-wave waveform out of phase by applying the half-wave waveform to the first electrode and connect said second electrode to said ground during the first half of a designated cycle for each said channel; and
apply the half-wave waveform to the second electrode and connect said first electrode to said ground during the second half of said designated cycle for each said channel.

28. The intensity controller of claim 24, wherein each cycle within said cycle set comprises a first and second half, said drive circuit further configured to:
connect said first electrode and said second electrode to said ground during said first half of a designated cycle for each said channel; and apply said half-wave waveform in phase by applying the half-wave waveform to the first electrode and to the second electrode during said second half of said designated cycle for each said channel.

29. The intensity controller of claim 15, wherein electroluminescent display further comprises an illumination threshold, said sinusoidal waveform further comprising a voltage amplitude exceeding said illumination threshold of said electroluminescent display.

30. The intensity controller of claim 15, wherein said sinusoidal waveform comprises a frequency of 1000 Hz and said cycle set comprises 16 cycles.

31. A device operable by a user comprising:
an electroluminescent display having a first electrode, a second electrode
and a ground; and
an intensity controller for an electroluminescent display having a first
electrode, a second electrode and a ground, the intensity controller comprising:
a processor;
a waveform generator controlled by the processor configured to
generate a waveform signal;
a drive circuit controlled by the processor and coupled to said waveform generator, said drive circuit configured to receive said waveform signal from said waveform generator and generate a substantially sinusoidal waveform across said first and second electrode to illuminate the electroluminescent display, said sinusoidal waveform further comprising a cycle set having a plurality n of cycles, and
an intensity controller executed by said processor, said intensity controller configured to adjust an illumination intensity of said electroluminescent display by adding or removing at least one skip cycle in said cycle set.

32. The device of claim 31, wherein a number of non-skip cycles to the number of cycles in said cycle set establishes an overall duty cycle for said cycle set.

33. The device of claim 31, wherein said-skip cycle is a substantially cancelled cycle.

34. The device of claim 31, further comprising an aging controller executed by said processor configured to:
determine a change in impedance of said electroluminescent display; and
adjust said illumination intensity if said change in impedance exceeds a threshold value by removing at least one skip cycle in said cycle set.

35. The device of claim 31, further comprising an aging controller executed by said processor configured to:
determine a change in capacitance of said electroluminescent display; and
adjust said illumination intensity if said change in capacitance exceeds a threshold value by removing at least one skip cycle in said cycle set.

36. The device of claim 31, wherein said cycle set includes an initial number m of skipped cycles, said intensity controller further comprising a color compensation controller executed by said processor configured to color adjust said illumination intensity by adding or removing at least one skip cycle in said cycle set.

37. The device of claim 36, wherein said electroluminescent display comprises a color filter, said color compensation controller configured to adjust said illumination intensity by removing at least one skip cycle in said cycle set.

38. The device of claim 31 further comprising a power supply configured to provide a DC voltage and a ground, said power supply coupled to said waveform generator, said waveform generator further configured to generate a half-wave waveform from said DC voltage, said drive circuit configured to apply said half-wave waveform in phase during a skip cycle.

39. The device of claim 38, wherein said drive circuit is further configured to apply said half-wave waveform out of phase during non-skip cycles.

40. The device of claim 38, wherein said drive circuit is further configured to apply said half-wave waveform in phase for the entire cycle set to cancel illumination of said electroluminescent display during an off state.

41. The device of claim 39, wherein each cycle within said cycle set comprises a first and second half, said drive circuit further configured to:
apply said half-wave waveform out of phase by applying the half-wave waveform to the first electrode and connect said second electrode to said ground during the first half of a designated cycle, and
apply the half-wave waveform to the second electrode and connect said first electrode to said ground during the second half of said designated cycle.

42. The device of claim 38, wherein each cycle within said cycle set comprises a first and second half, said drive circuit further configured to:
connect said first electrode and said second electrode to said ground during said first half of a designated cycle; and
apply said half-wave waveform in phase by applying the half-wave waveform to the first electrode and to the second electrode during said second half of said designated cycle.

43. The device of claim 31, wherein electroluminescent display further comprises an illumination threshold, said sinusoidal waveform further comprising a voltage amplitude exceeding said illumination threshold of said electroluminescent display.

44. The device of claim 31, wherein said sinusoidal waveform comprises a frequency of 1000 Hz and said cycle set comprises 16 cycles.

45. The device of claim 31, wherein said device comprises a gaming device having a game of chance playable by said user, said electroluminescent display adjusted according to operation of said game of chance.

46. A method for controlling the illumination intensity of an electroluminescent display having a first electrode, a second electrode, said method comprising:
generating a substantially sinusoidal waveform;
applying said sinusoidal waveform across said first and second electrode to illuminate the electroluminescent display, said sinusoidal waveform further comprising a cycle set having a plurality n of cycles, and adjusting an illumination intensity of said electroluminescent display by adding or removing at least one skip cycle in said cycle set.

47. The method of claim 46, wherein a number of non-skip cycles to the number of cycles in said cycle set establishes an overall duty cycle for said cycle set.

48. The method of claim 46, wherein said skip cycle is a substantially cancelled cycle.

49. The method of claim 46, further comprising:
determining a change in impedance of said electroluminescent display; and
adjusting said illumination intensity if said change in impedance exceeds a threshold value by removing at least one skip cycle in said cycle set.

50. The method of claim 46, further comprising:
- determining a change in capacitance of said electroluminescent display; and
- adjusting said illumination intensity if said change in capacitance exceeds a threshold value by removing at least one skip cycle in said cycle set.

51. The method of claim 46, wherein said cycle set includes an initial number m of skipped cycles, said method further comprising adjusting said illumination intensity by adding or removing at least one skip cycle in said cycle set.

52. The method of claim 51, wherein said electroluminescent display comprises a color filter, said method further comprising adjusting said illumination intensity by removing at least one skip cycle in said cycle set.

53. The method of claim 46, wherein said generating said sinusoidal waveform further comprises generating a half-wave waveform from a power supply providing a DC voltage and a ground, said method further comprising applying said half-wave waveform in phase during a skip cycle.

54. The method of claim 53, further comprising applying said half-wave waveform out of phase during non-skip cycles.

55. The method of claim 53, further comprising applying said half-wave waveform in phase for the entire cycle set to cancel illumination of said electroluminescent display during an off state.

56. The method of claim 54, wherein each cycle within said cycle set comprises a first and second half, said applying said half-wave waveform out of phase comprising:
- applying the half-wave waveform to the first electrode and connecting said second electrode to said ground during the first half of a designated cycle; and
- applying the half-wave waveform to the second electrode and connecting said first electrode to said ground during the second half of said designated cycle.

57. The method of claim 53, wherein each cycle within said cycle set comprises a first and second half, said applying said half-wave waveform in phase comprising:
- connecting said first electrode and said second electrode to said ground during said first half of a designated cycle; and
- applying said half-wave waveform in phase by applying the half-wave waveform to the first electrode and to the second electrode during said second half of said designated cycle.

58. The method of claim 46, wherein electroluminescent display further comprises an illumination threshold, said sinusoidal waveform further comprising a voltage amplitude exceeding said illumination threshold of said electroluminescent display.

59. The method of claim 46, wherein said sinusoidal waveform comprises a frequency of 1000 Hz and said cycle set comprises 16 cycles.

60. A program storage device readable by a machine, tangibly embodying a program of instructions executable by the machine to perform a method for controlling the illumination intensity of an electroluminescent display having a first electrode, a second electrode, said method comprising:
- generating a substantially sinusoidal waveform;
- applying said sinusoidal waveform across said first and second electrode to illuminate the electroluminescent display, said sinusoidal waveform further comprising a cycle set having a plurality n of cycles, and
- adjusting an illumination intensity of said electroluminescent display by adding or removing at least one skip cycle in said cycle set.

61. The program storage device of claim 60, wherein a number of non-skip cycles to the number of cycles in said cycle set establishes an overall duty cycle for said cycle set.

62. The program storage device of claim 60, wherein said skip cycle is a substantially cancelled cycle.

63. The program storage device of claim 60, said method further comprising:
- determining a change in impedance of said electroluminescent display; and
- adjusting said illumination intensity if said change in impedance exceeds a threshold value by removing at least one skip cycle in said cycle set.

64. The program storage device of claim 60, said method further comprising:
- determining a change in capacitance of said electroluminescent display; and
- adjusting said illumination intensity if said change in capacitance exceeds a threshold value by removing at least one skip cycle in said cycle set.

65. The program storage device of claim 60, wherein said cycle set includes an initial number m of skipped cycles, said method further comprising adjusting said illumination intensity by adding or removing at least one skip cycle in said cycle set.

66. The program storage device of claim 65, wherein said electroluminescent display comprises a color filter, said method further comprising adjusting said illumination intensity by removing at least one skip cycle in said cycle set.

67. The program storage device of claim 60, wherein said generating said sinusoidal waveform further comprises generating a half-wave waveform from a power supply providing a DC voltage and a ground, said method further comprising applying said half-wave waveform in phase during a skip cycle.

68. The program storage device of claim 67, further comprising applying said half-wave waveform out of phase during non-skip cycles.

69. The program storage device of claim 67, further comprising applying said half-wave waveform in phase for the entire cycle set to cancel illumination of said electroluminescent display during an off state.

70. The program storage device of claim 68, wherein each cycle within said cycle set comprises a first and second half, said applying said half-wave waveform out of phase comprising:
- applying the half-wave waveform to the first electrode and connecting said second electrode to said ground during the first half of a designated cycle; and
- applying the half-wave waveform to the second electrode and connecting said first electrode to said ground during the second half of said designated cycle.

71. The program storage device of claim 67, wherein each cycle within said cycle set comprises a first and second half, said applying said half-wave waveform in phase comprising:
- connecting said first electrode and said second electrode to said ground during said first half of a designated cycle; and
- applying said half-wave waveform in phase by applying the half-wave waveform to the first electrode and to the second electrode during said second half of said designated cycle.

72. The program storage device of claim 60, wherein electroluminescent display further comprises an illumination threshold, said sinusoidal waveform further comprising a voltage amplitude exceeding said illumination threshold of said electroluminescent display.

73. The program storage device of claim 60, wherein said sinusoidal waveform comprises a frequency of 1000 Hz and said cycle set comprises 16 cycles.

* * * * *